(12) United States Patent
Morris et al.

(10) Patent No.: US 7,319,997 B1
(45) Date of Patent: Jan. 15, 2008

(54) DYNAMIC PARTITION ENHANCED JOINING

(75) Inventors: J. Mark Morris, Poway, CA (US); Bhashyam Ramesh, San Diego, CA (US)

(73) Assignee: NCR Corp., Dayton, OH (US)

(*) Notice: Subject to any disclaimer, the term of this patent is extended or adjusted under 35 U.S.C. 154(b) by 450 days.

(21) Appl. No.: 10/862,686

(22) Filed: Jun. 7, 2004

(51) Int. Cl.
*G06F 7/00* (2006.01)
*G06F 17/30* (2006.01)
*G06F 17/00* (2006.01)

(52) U.S. Cl. ............... 707/3; 707/100; 707/101; 707/104.1

(58) Field of Classification Search ......... 707/1–10, 707/100–104.1, 200–206
See application file for complete search history.

(56) References Cited

U.S. PATENT DOCUMENTS

| 5,930,785 | A  | * | 7/1999  | Lohman et al. ......... 707/2 |
| 5,983,215 | A  | * | 11/1999 | Ross et al. ............ 707/2 |
| 6,167,399 | A  | * | 12/2000 | Hoang ................. 707/5 |
| 6,226,639 | B1 | * | 5/2001  | Lindsay et al. ........ 707/5 |
| 6,505,189 | B1 | * | 1/2003  | On Au et al. .......... 707/2 |
| 2003/0074348 | A1 | * | 4/2003 | Sinclair et al. ....... 707/2 |
| 2004/0260684 | A1 | * | 12/2004 | Agrawal et al. ....... 707/3 |

* cited by examiner

*Primary Examiner*—Apu Mofiz
*Assistant Examiner*—Jared M Bibbee
(74) *Attorney, Agent, or Firm*—Howard Speigut

(57) ABSTRACT

Methods, computer programs, and database systems for performing a database query that includes a join on an equality condition are disclosed. The method includes defining two or more first-table partitions and two or more corresponding second-table partitions. The method includes performing the join on the first-table partition and the second-table partition, storing the result, and merging the results.

36 Claims, 9 Drawing Sheets

DYNAMIC PARTITION ENHANCED JOINING

CROSS REFERENCE TO RELATED APPLICATIONS

This application is related to the U.S. patent application Ser. No. 10/862,689 entitled Dynamic Partition Enhanced Joining Using A Value-Count Index by Mark Morris and Bhashyam Ramesh, filed on even date.

This application is related to the U.S. patent application Ser. No. 10/862,649 entitled Dynamic Partition Enhanced Inequality Joining Using A Value-Count Index by Mark Morris and Bhashyam Ramesh, filed on even date.

BACKGROUND

One important feature in relational database system (RDBMS) is the ability to perform queries that join columns from two or more tables. An example of a query including a join is:

SELECT T1.*, T2.* FROM T1, T2 WHERE T1.A equality_condition T2.B;

where T1 and T2 are tables, T1.A is a column in T1, T2.B is a column in T2, and equality_condition is any condition requiring equality between the operands to the condition. The example query above will return all of the columns in T1 horizontally concatenated with all of the columns in T2, for rows where T1.A and T2.B satisfy the equality condition. In mathematical terms, this query may be described as a Cartesian product with a condition or cross product with a condition.

SUMMARY

In general, in one aspect, the invention features a method of performing a database query that includes a join on an equality condition between one or more columns in a first table and one or more columns in a second table. The first table and the second table each include zero or more rows. The method includes defining two or more first-table partitions, where each row in the first table appears in exactly one first-table partition. The method includes defining two or more second-table partitions. Each second-table partition corresponds to a first-table partition. Each row in the second table appears in exactly one second-table partition. The method includes performing the join on the first-table partition and the second-table partition for one or more corresponding first-table partitions and second-table partition. Storing the result, and merging the results.

Implementations of the invention may include one or more of the following. Defining the two or more first-table partitions and the two or more second-table row sets may include acquiring first-table-demographic data for the one or more columns in the first table. The demographic data may include zero or more first-table-column values. Defining the two or more first-table partitions and the two or more second-table row sets may include acquiring second-table-demographic data for the one or more columns in the second table. The demographic data may include zero or more second-table-column values. Defining the two or more first-table partitions and the two or more second-table row sets may include creating a qualifying set by joining the first table demographic data and the second table demographic data on the equality condition. Defining the two or more first-table partitions and the two or more second-table row sets may include partitioning the first table into the two or more first-table partitions, using the qualifying set. Defining the two or more first-table partitions and the two or more second-table row sets may include partitioning the second table into the two or more second-table partitions using the qualifying set. The demographic data may include one or more value count indexes. The demographic data may include one or more compressed value lists. The demographic data includes one or more column statistics.

Partitioning the first table into the two or more first-table partitions may include creating two or more work tables. Partitioning the first table into the two or more first-table partitions may include selecting a target work table based on the qualifying set and one or more first-table-row values for each first-table row. Partitioning the first table into the two or more first-table partitions may include placing the first-table row in the target work table for each first-table row. Selecting a target work table may include determining whether one of the first-table-row values is in the qualifying set. Partitioning the first table into the two or more first-table partitions may include creating a work table with a partitioned-primary index. Partitioning the first table into the two or more first-table partitions may include defining the partitioned-primary index based on the qualifying set. Partitioning the first table into the two or more first-table partitions may include populating the work table from the first table. Defining the partitioned-primary index based on the qualifying set may include defining the partitioned-primary index so that rows with first-table-column values in the qualifying set are placed in a first partition. Defining the partitioned-primary index based on the qualifying set may include defining the partitioned-primary index so that rows with first-table-column values that are not in the qualifying set are placed in a second partition.

Partitioning the second table into the two or more second-table partitions may include creating two or more work tables. Partitioning the second table into the two or more second-table partitions may include, for each second-table row: selecting a target work table based on the qualifying set and one or more second-table-row values. Partitioning the second table into the two or more second-table partitions may include, for each second-table row: placing the second-table row in the target work table. Selecting a target work table may include determining whether one of the second-table-row values is in the qualifying set.

Partitioning the second table into the two or more second-table partitions may include creating a work table with a partitioned-primary index. Partitioning the second table into the two or more second-table partitions may include defining the partitioned-primary index based on the qualifying set. Partitioning the second table into the two or more second-table partitions may include populating the work table from the second table. Defining the partitioned-primary index based on the qualifying set may include defining the partitioned-primary index so that rows with second-table-column values in the qualifying set are placed in a first partition and rows with second-table-column values not in the qualifying set are placed in a second partition.

In general, in another aspect, the invention features a computer program, that is stored on a tangible storage medium. The computer program is for use in performing a database query that includes a join on an equality condition between one or more columns in a first table and one or more columns in a second table. The first table and the second table each include zero or more rows. The computer program includes executable instructions. The executable instructions cause a computer to define two or more first-table partitions. Each row in the first table appears in exactly one first-table partition. The executable instructions cause a computer to define two or more second-table partitions. Each second-table partition corresponds to a first-table partition. Each row in the second table appears in exactly one second-table partition. The executable instructions cause a computer to perform the join on the first-table partition and the second-table partition for one or more corresponding first-table partitions and second-table partitions. The executable instructions cause a computer to store a result for one or more corresponding first-table partitions and second-table partitions. The executable instructions cause a computer to merge the results.

In general, in another aspect, the invention features a database system that includes a massively parallel processing system. The massively parallel processing system includes one or more nodes, a plurality of CPUs, a plurality of data storage facilities, and a process for execution on the massively parallel processing system for performing a database query including a join on an equality condition between one or more columns in a first table and one or more columns in a second table. Each of the one or more nodes provides access to one or more CPUs. Each of the one or more CPUs provide access to one or more data storage facilities. The first table and the second table each include zero or more rows. The process includes defining two or more first-table partitions, where each row in the first table appears in exactly one first-table partition. The process includes defining two or more second-table partitions. Each second-table partition corresponds to a first-table partition. Each row in the second table appears in exactly one second-table partition. The process includes, for one or more corresponding first-table partitions and second-table partitions: performing the join on the first-table partition and the second-table partition, storing the result, and merging the results.

DETAILED DESCRIPTION

Figure 1:
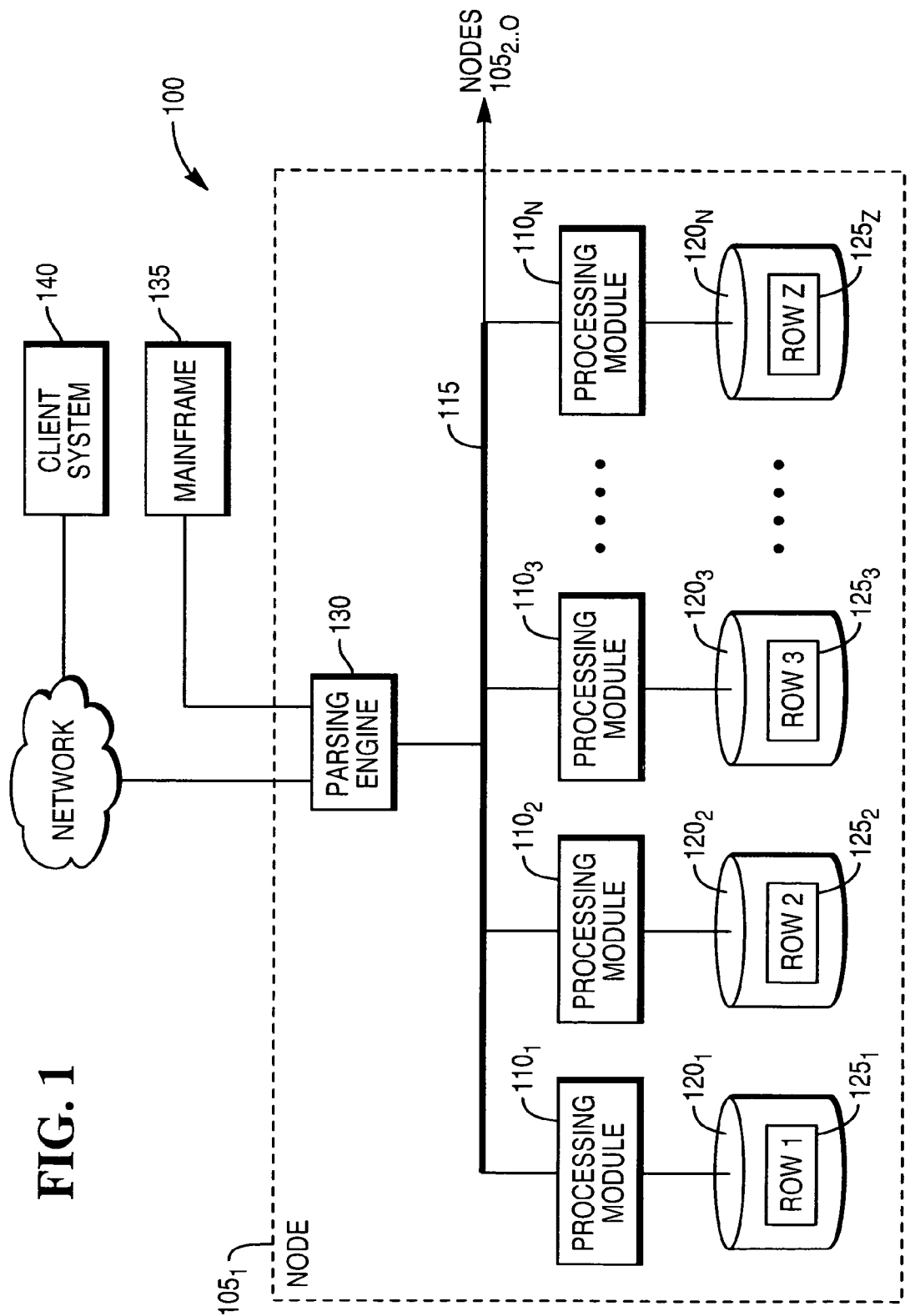
FIG. 1 is a block diagram of a node of a database system.

The techniques for performing joins disclosed herein have particular application, but are not limited to, large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
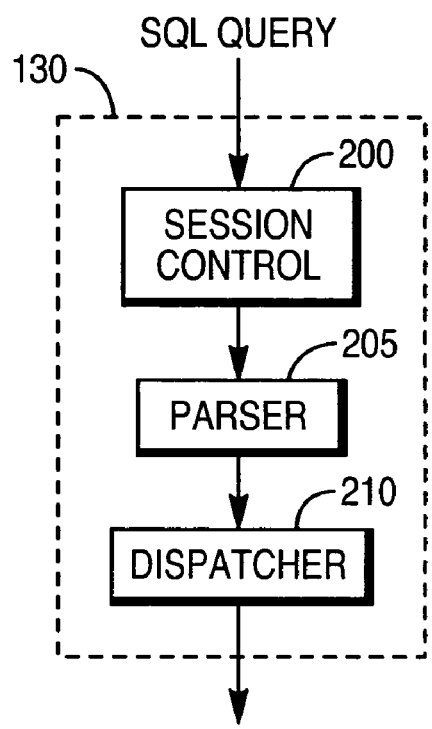
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
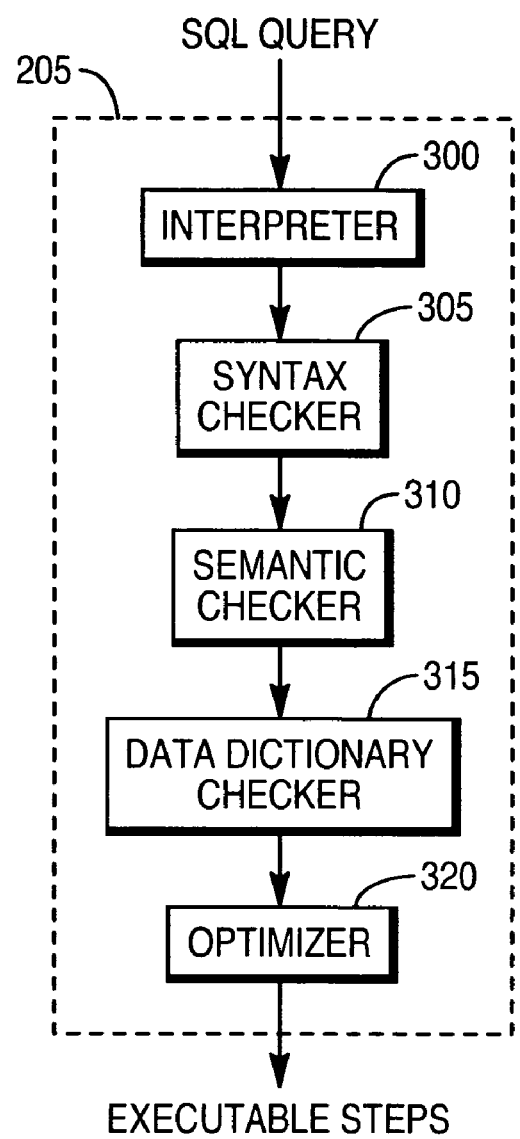
FIG. 3 is a flow chart a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

Figure 4:
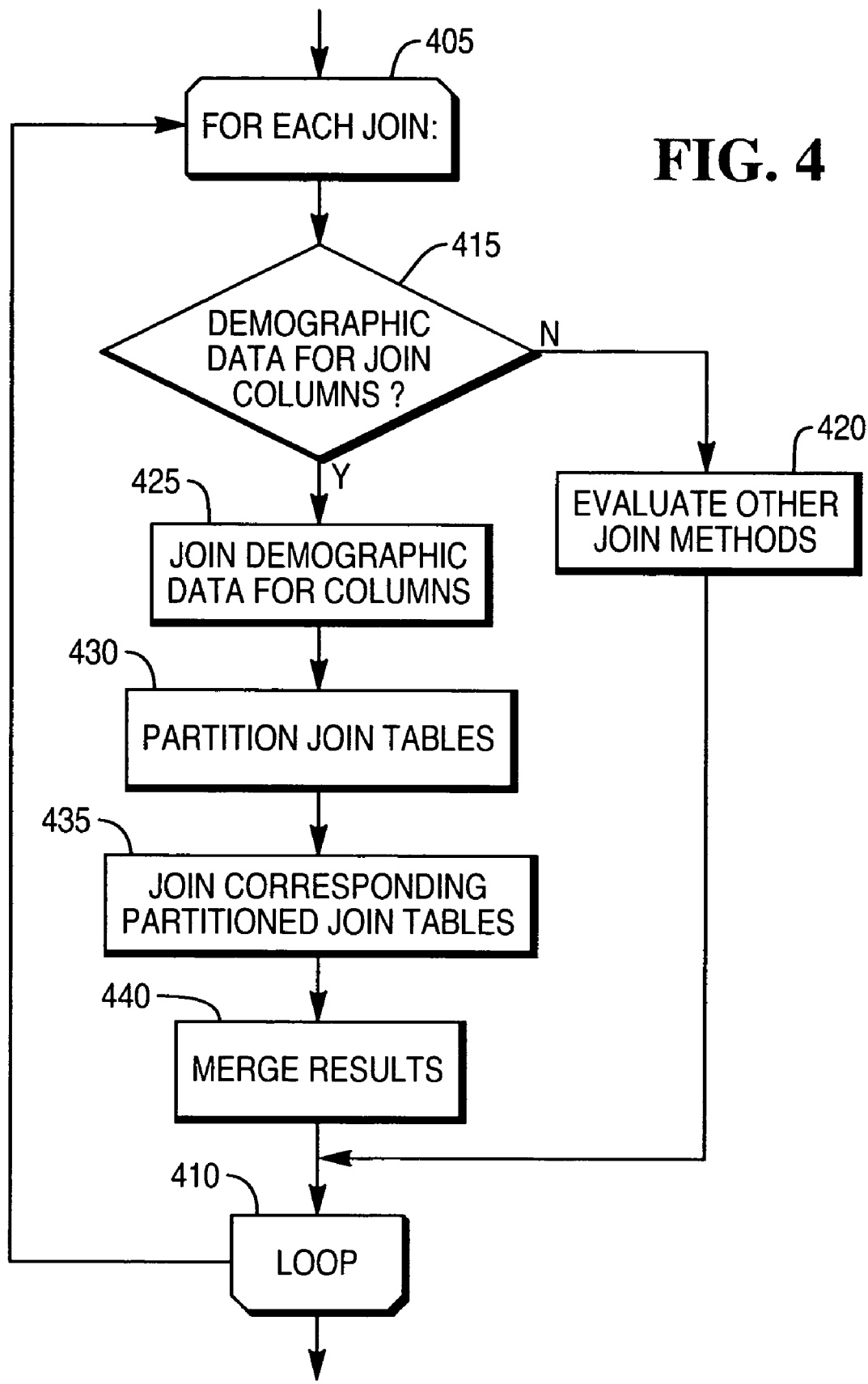
FIG. 4 is a flow chart of a system for performing a join.

An example system for performing a SQL query including one or more joins is shown in FIG. 4. The system starts and enters a loop defined by blocks 405 and 410. The system will loop once for each join in the SQL query (block 405). For example, assume the system receives the following SQL query:

SELECT T1.*, T2.*, T3.* FROM T1, T2, T3 WHERE T1.A equality_condition T2.B AND T1.A equality condition T3.C;

where T1, T2, and T3 are tables, T1.A is a column in T1, T2.B is a column in T2, and T3.C is a column in T3. In one example implementation, the system will first perform a join between T1 and T2 on the condition T1.A equality_condition T2.B. Next, the system will perform a join between T1 and T3 on the condition T1.A equality_condition T3.C. Finally, the system will perform a join of the two previous results. In this example implementation, the query is decomposed into three join operations and the system will loop (block 405 and 410) three times.

Another example system for performing a SQL query including one or more joins performs the example SQL query above using two joins. The system performs a join between T1 and T2 on the condition T1.A equality_condition T2.B and stores the result. In one example implementation, the result is stored in a work table or a spool table S1. The system then performs a join between T3 and S1 on the condition S1.A equality_condition T3.C.

Within the loop defined by blocks 405 and 410 the system determines if there is demographic data for all join columns (block 415), where demographic data is described below. If there is not demographic data for all join columns the system evaluates one or more other methods to perform the join between the two columns (block 420) and proceeds to block 410.

Figure 5:
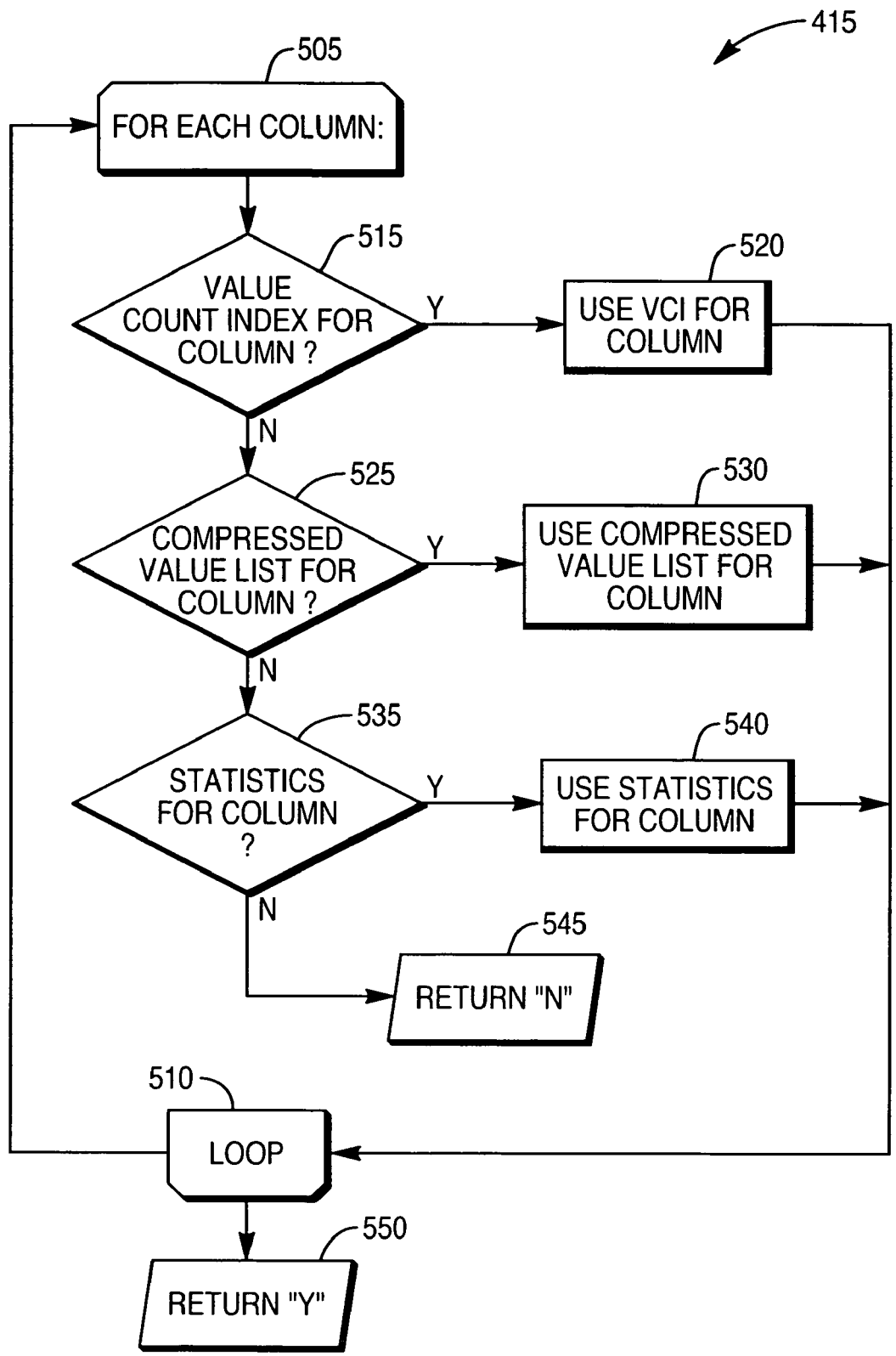
FIG. 5 is a flow chart of a system for determining if demographic data exists for columns.

An example system for determining if there is demographic data for all join columns (block 415) is shown in FIG. 5. The system enters a loop defined by block 505 and 510 and loops once for each column involved in the join. Within the loop, the system determines if there is a value-count index (VCI) for the column (block 515). One example VCI is an aggregate join index that is automatically updated each time a value in indexed column is added, deleted, or altered. The VCI typically contains two columns: a value column and a count column. The value column represents the value in the indexed column and the count column represents the number of occurrences of the value in the column. In certain example implementations, the VCI is the preferred demographic data to use when performing the join operation due to its accuracy. Therefore, if the column has a VCI it is used (block 520) and the system proceeds to block 510.

If there is no VCI for the column, the system determines if there is a compressed value list for the column (block 525). An example compressed value list is a set of one or more values representing values in a column. In certain example implementations, the compressed value list is stored in the table header. In certain example implementations, values appearing in the compressed value list appeared in a minimum number or a percentage of rows in the column the last time the compressed value list was created or updated. In these implementations, the DBS 100 updates the compressed value list from time to time to reflect the frequently occurring values in the column. If the compressed value list is not updated continuously, it may contain one or more values to do not appear in the column. Likewise, it may not contain one or more values that appear frequently in the column. If there is a compressed value list the system will use the compressed value list for the column (block 530) and proceed to block 510.

If there is not a compressed value list for the column, the system will then determine if there are statistics for the column (block 535). The statistics represent the values in the column and may track the number or percentage of rows in which each of the values appeared the last time the statistics were created or updated. In certain example systems, the statistics may be updated from time to time to assist the DBS 100 in performing SQL queries or other operations. If the statistics not updated continuously, they may contain one or more values that do not appear in the column. Likewise, statistics may not contain one or more values that appear frequently in the column. If there are statistics for the column the system uses the statistics for the column (block 540) and proceeds to block 510.

If there is not a VCI for the column (block 515), a compressed value list for the column (block 525), or statistics for the column (block 535), the system returns "N" (block 545) and ends. If, however, there is at least one source of demographic data for each of the columns the system will return "Y" (block 550).

Figure 6:
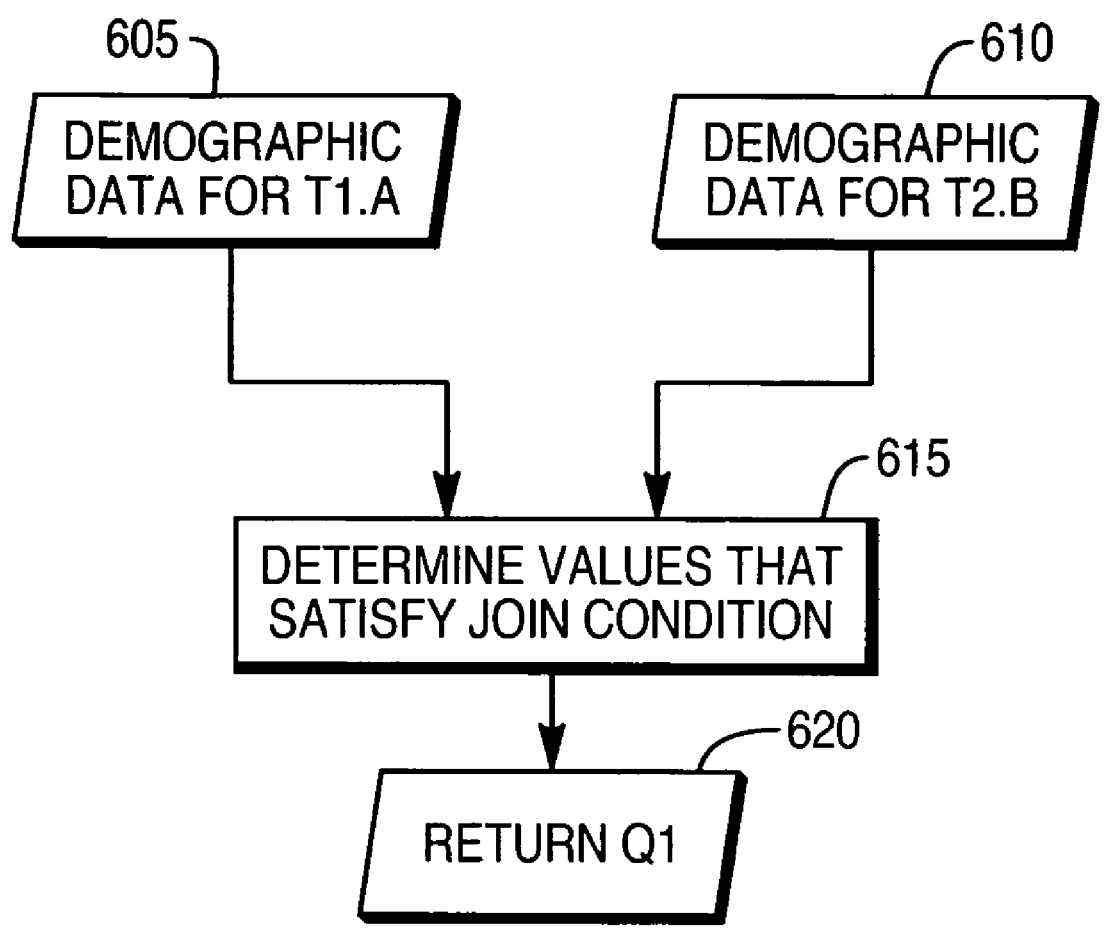
FIG. 6 is a flow chart of a system for joining demographic data.

Returning to FIG. 4, if there is demographic data for all join columns the system joins the demographic data for the join columns (block 425). FIG. 6 shows an example system for joining the demographic data for the join columns. The system receives demographic data for the first column (e.g., T1.A) (block 605) and demographic data for the second column (e.g., T2.B) (block 610). Regardless of the source of demographic data selected for each column in block 415, the demographic data will contain zero or more values that appear in each of the columns. The system then determines which demographic-data values for the join columns satisfy the join condition (block 615). For example, assume the system receives the query:

SELECT T1.*, T2.*, T3.* FROM T1, T2, T3 WHERE T1.A equality_condition T2.B AND T1.A equality condition T3.C;

and is currently evaluating the join condition "T1.A equality_condition T2.B." The system receives a set of zero or more demographic-data values for T1.A (block 605) and zero or more demographic-data values appearing in T2.B (block 610) and determines which of these values satisfy "equality_condition" (block 615). The system returns the values that satisfy the equality_condition as qualifying set Q1 (block 620).

Figure 7:
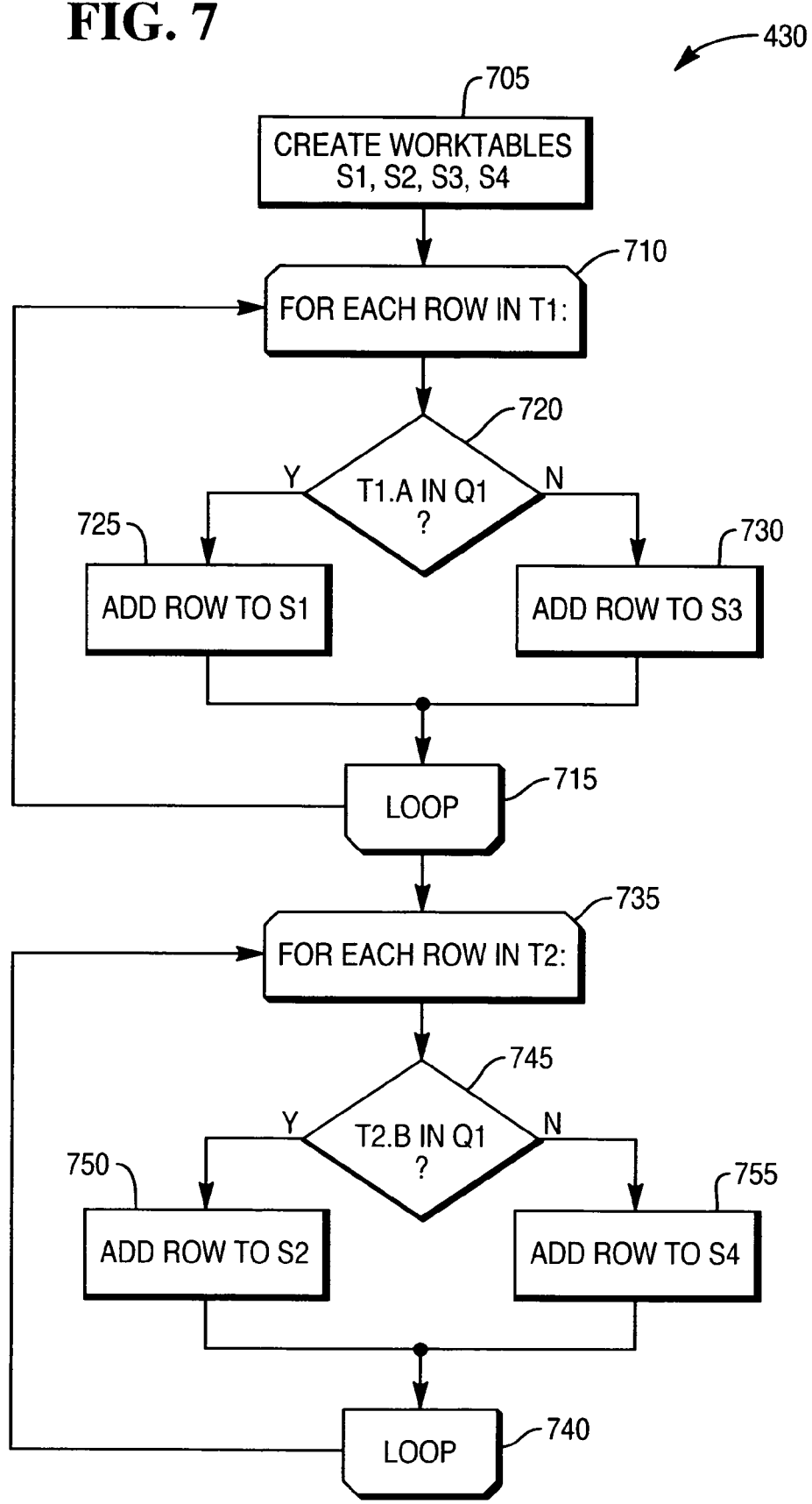
FIG. 7 is a flow chart of a system for partitioning join tables.

Returning to FIG. 4, after joining the demographic data (block 425), the system partitions the join tables into row sets (block 430). An example system for partitioning the join tables (block 430) is shown in FIG. 7. The system creates four work tables S1, S2, S3, and S4 (block 705) for partitioning each of the tables T1 and T2 into two partitions. In other example systems, the system 425 partitions each of the tables into R partitions and creates 2R work tables to represent the partitions.

After creating the worktables (block 705), the system enters a loop defined by block 710 and 715. The system loops once for each row in T1 (block 710). In certain example systems, this loop is implemented as a scan of T1. Within the loop, the system determines if the value in column A of the row is in Q1 (block 720) and, if so, the system adds the row to S1 (block 725), otherwise the system adds the row to S3 (block 730). In certain example implementations, block 720 may be implemented by determining if T1.A is in an IN list, where the IN list is populated with the values from Q1. Although this example implementation partitions T1 into two partitions, in general, the system may partition T1 into any number of partitions. Also, although the example implementation adds the entire row from T1 to S1 or S3, other example implementations add only a subset of the columns from T1 to S1 or S3.

After partitioning T1, the system proceeds to block 735 where it enters a loop defined by block 735 and 740. The system loops once for each row in T2 (block 735). In certain example systems, this loop is implemented as a scan of T2. Within the loop, the system determines if the value in column B in the row is in Q1 (block 745) and, if so, the system adds the row to S2 (block 750), otherwise the system adds the row to S4 (block 755). In certain example implementations, block 745 may be implemented by determining if T2.B is in an IN list, where the IN list is populated with the values from Q1. Although this example implementation partitions T2 into two partitions, in general, the system may partition T2 into N partitions. The N partitions of T2 correspond to the N partitions of T1 because the same operation is performed to partition the tables (e.g., determining if the values in a column appear in a IN list populated with values from Q1). Also, although the example implementation adds the entire row from T2 to S2 or S4, other example implementations add only a subset of the columns from T2 to S1 or S3.

Figure 8:
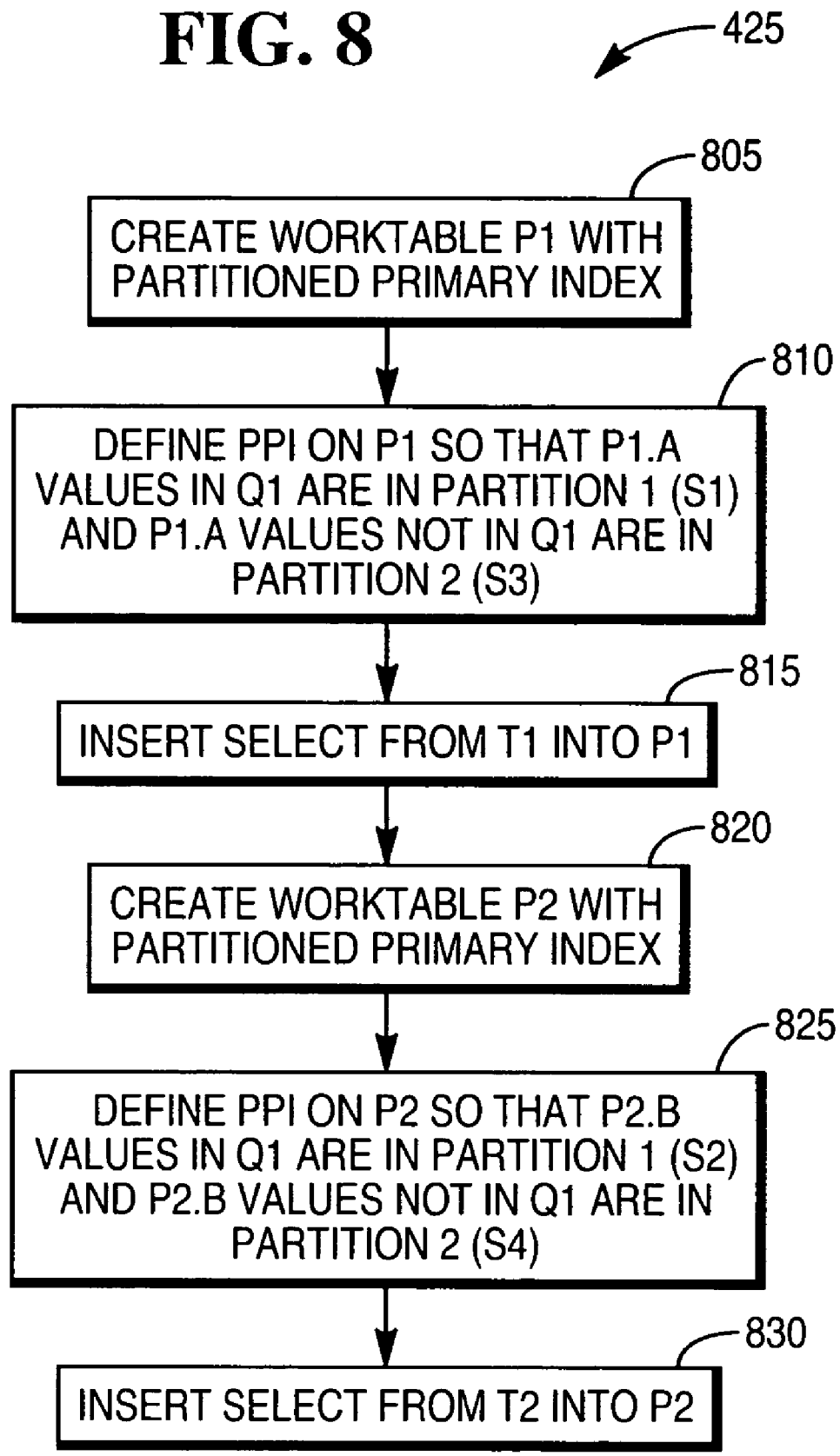
FIG. 8 is a flow chart of a system for partitioning join tables.

Another example system for partitioning the join tables (block 430) is shown in FIG. 8. The system creates a worktable P1 with a partitioned primary index (PPI) (block 805). A PPI is mechanism for arranging and segregating the table rows based on the value of the primary index. The system defines the PPI for P1 so that rows where P1.A is in Q1 are placed in a first partition (S1) and rows where P2.A is not in Q1 are placed in a second partition (S3) (block 810). The system then performs an INSERT SELECT from T1 into P1 (block 815), resulting in a partitioned T1 in P1. Although this example implementation partitions T1 into two partitions, in general, the system may partition T1 into an arbitrary number of partitions. Also, although the example implementation adds entire rows of T1 to P1, other example implementations add only a subset of the columns from T1 into P1.

After partitioning T1, the example system creates a worktable P2 with a partitioned primary index (block 820), and defines the partitioned primary index so that rows where P2.B is in Q1 are placed in a first partition (S2) and rows where P2.B are not in Q1 are placed in a second partition (S4) (block 825). The system then performs an INSERT SELECT from T2 into P2 (block 825), resulting in a partitioned T2 in P2. Although this example implementation partitions T2 into two partitions, in general, the system may partition T2 into an arbitrary number of partitions. As in the previous example system for partitioning T1 and T2, each table has an equal number of partitions, because the same operation is performed on each table to create the partitions. Also, although the example implementation adds the entire rows from T2 to P2, other example implementations add only a subset of the columns from T2 into P2.

Figure 9:
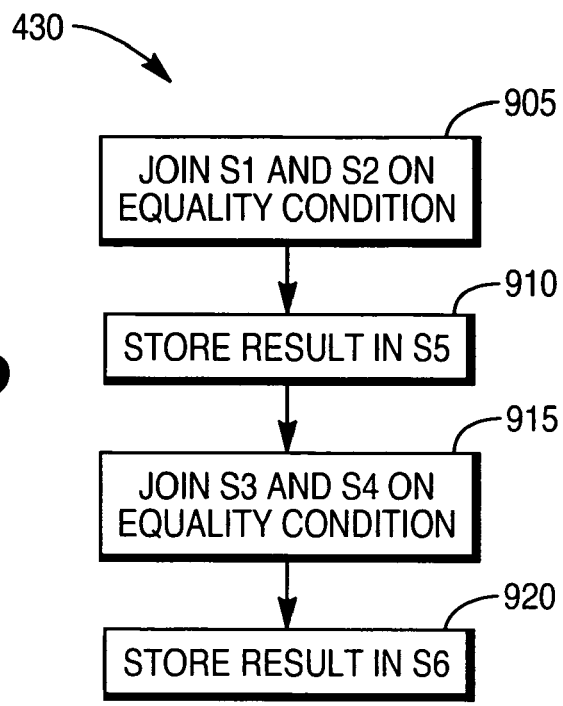
FIG. 9 is a flow chart of a system for joining partitioned tables.

Returning to FIG. 4, after partitioning the join tables, the system joins corresponding partitions in the partitioned join tables (block 435). An example system for joining the partitioned join tables is shown in FIG. 9. The system joins S1 and S2 on the equality condition (e.g., SELECT S1.*, S2.* FROM S1, S2 WHERE S1.A equality_condition S2.B) (block 905) and stores the result in worktable S5. The system joins S3 and S4 on the equality condition (e.g., SELECT S3.*, S4.* FROM S3, S4 WHERE S3.A equality_condition S4.B) (block 915) and stores the result in S6 (block 920).

Figure 10:
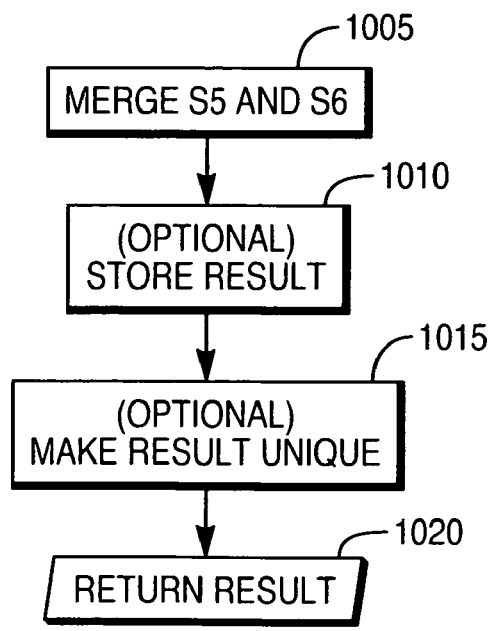
FIG. 10 is a flow chart of a system for merging.

Returning to FIG. 4, after joining the corresponding partitions in the partitioned tables, the system merges the results to create a final result for the join (block 440). FIG. 10 shows an example system for merging the results to create a final result for the join. The system merges worktables S5 and S6 (block 1005). In one example implementation, the system vertically concatenates the rows of S5 and S6. In some example implementations, the system may sort (block 1010) and make the resulting table unique for one or more column values (block 1015). Finally, the system returns the resulting table (block 1020).

Figure 11:
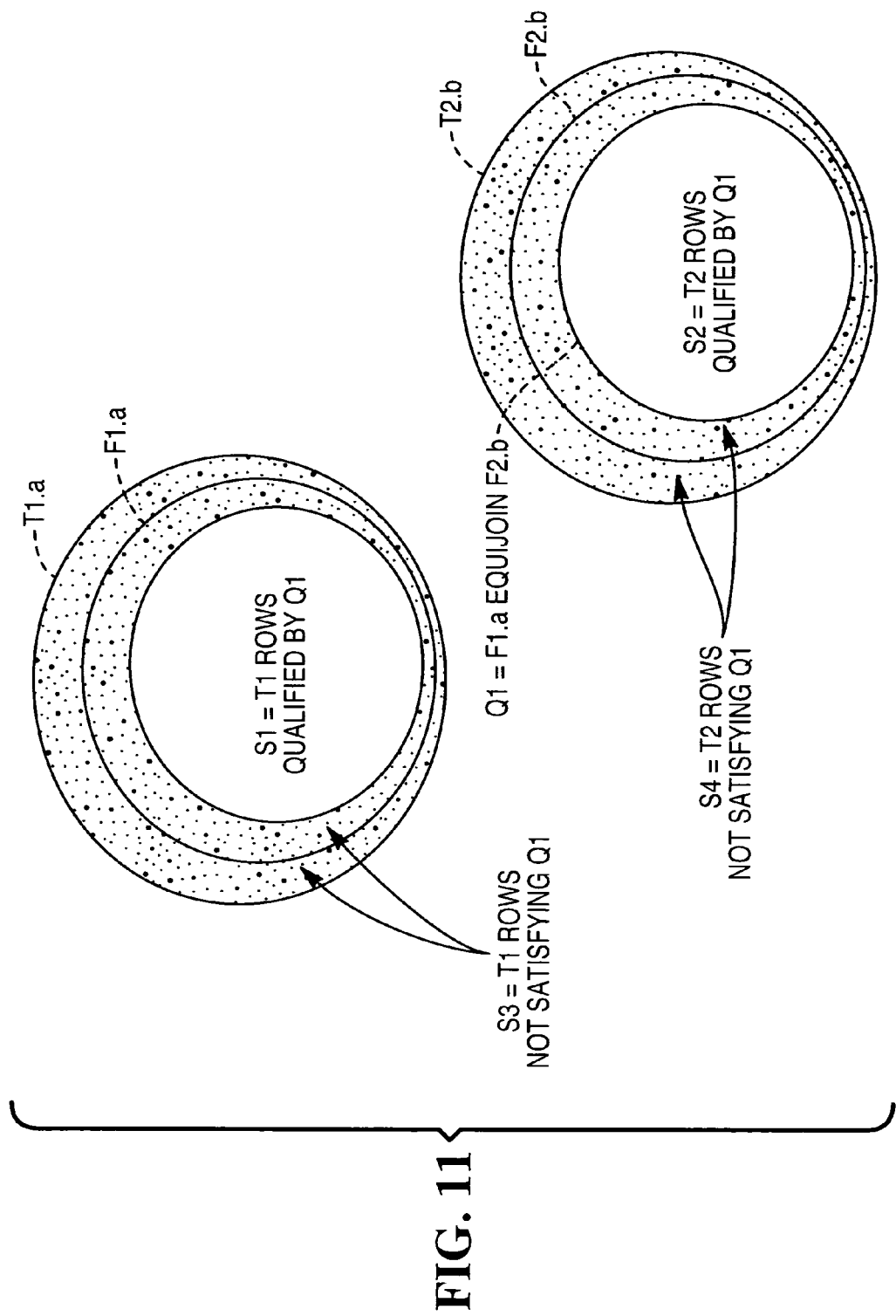
FIG. 11 is a illustration of a Vinh diagram of the system for performing a join.

An alternative representation of an example system for performing a SQL query including one or more joins is shown in FIG. 11 in diagram form.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a database query including a join on an equality condition between one or more columns in a first table and one or more columns in a second table, each of the first table and the second table including zero or more rows, the method including:
   defining two or more first-table partitions, where each row in the first table appears in exactly one first-table partition;
   defining two or more second-table partitions, each second-table partition corresponding to a first-table partition, and where each row in the second table appears in exactly one second-table partition;
   where defining the two or more first-table partitions and the two or more second-table partitions includes:
      acquiring first-table-demographic data for the one or more columns in the first table, the demographic data including zero or more first-table-column values;
      acquiring second-table-demographic data for the one or more columns in the second table, the demographic data including zero or more second-table-column values;
      creating a qualifying set by joining the first table demographic data and the second table demographic data on the equality condition;
      partitioning the first table into the two or more first-table partitions, using the qualifying set; and
      partitioning the second table into the two or more second-table partitions, using the qualifying set; and
   for one or more corresponding first-table partitions and second-table partitions:
      performing the join on the first-table partition and the second-table partition; and
      storing the result; and
   merging the results.

2. The method of claim 1, where the demographic data includes one or more value count indexes.

3. The method of claim 1, where the demographic data includes one or more compressed value lists.

4. The method of claim 1, where the demographic data includes one or more column statistics.

5. The method of claim 1, where partitioning the first table into the two or more first-table partitions includes:
creating two or more work tables;
for each first-table row:
selecting a target work table based on the qualifying set and one or more first-table-row values; and
placing the first-table row in the target work table.

6. The method of claim 5, where selecting a target work table includes:
determining whether one of the first-table-row values is in the qualifying set.

7. The method of claim 1, where partitioning the first table into the two or more first-table partitions includes:
creating a work table with a partitioned-primary index;
defining the partitioned-primary index based on the qualifying set; and
populating the work table from the first table.

8. The method of claim 7, where defining the partitioned-primary index based on the qualifying set includes:
defining the partitioned-primary index so that:
rows with first-table-column values in the qualifying set are placed in a first partition; and
rows with first-table-column values not in the qualifying set are placed in a second partition.

9. The method of claim 1, where partitioning the second table into the two or more second-table partitions includes:
creating two or more work tables; and
for each second-table row:
selecting a target work table based on the qualifying set and one or more second-table-row values; and
placing the second-table row in the target work table.

10. The method of claim 9, where selecting a target work table includes:
determining whether one of the second-table-row values is in the qualifying set.

11. The method of claim 1, where partitioning the second table into the two or more second-table partitions includes:
creating a work table with a partitioned-primary index;
defining the partitioned-primary index based on the qualifying set; and
populating the work table from the second table.

12. The method of claim 11, where defining the partitioned-primary index based on the qualifying set includes:
defining the partitioned-primary index so that;
rows with second-table-column values in the qualifying set are placed in a first partition; and
rows with second-table-column values not in the qualifying set are placed in a second partition.

13. A computer program, stored on a tangible storage medium, for use in performing a database query including a join on an equality condition between one or more columns in a first table and one or more columns in a second table, each of the first table and the second table including zero or more rows, the computer program including executable instructions that cause a computer to:
define two or more first-table partitions, where each row in the first table appears in exactly one first-table partition;
define two or more second-table partitions, each second-table partition corresponding to a first-table partition, and where each row in the second table appears in exactly one second-table partition;
where the executable instructions that cause the computer to define the two or more first-table partitions and the two or more second-table partitions further cause the computer to:
acquire first-table-demographic data for the one or more columns in the first table, the demographic data including zero or more first-table-column values;
acquire second-table-demographic data for the one or more columns in the second table, the demographic data including zero or more second-table-column values;
create a qualifying set by joining the first table demographic data and the second table demographic data on the equality condition; and
partition the first table into the two or more first-table partitions, using the qualifying set;
partition the second table into the two or more second-table partitions, using the qualifying set; and
for one or more corresponding first-table partitions and second-table partitions:
perform the join on the first-table partition and the second-table partition; and
store a result; and
merge the results.

14. The computer program of claim 13, where the demographic data includes one or more value count indexes.

15. The computer program of claim 13, where the demographic data includes one or more compressed value lists.

16. The computer program of claim 13, where the demographic data includes one or more column statistics.

17. The computer program of claim 13, where the executable instructions that cause the computer to partition the first table into the two or more first-table partitions further cause the computer to:
create two or more work tables;
for each first-table row:
select a target work table based on the qualifying set and one or more first-table-row values; and
place the first-table row in the target work table.

18. The computer program of claim 17, where the executable instructions that cause the computer to select a target work table further cause the computer to:
determine whether one of the first-table-row values is in the qualifying set.

19. The computer program of claim 13, where the executable instructions that cause the computer to partition the first table into the two or more first-table partitions further cause the computer to:
create a work table with a partitioned-primary index;
define the partitioned-primary index based on the qualifying set; and
populate the work table from the first table.

20. The computer program of claim 19, where the executable instructions that cause the computer to define the partitioned-primary index based on the qualifying set further cause the computer to:
defining the partitioned-primary index so that:
rows with first-table-column values in the qualifying set are placed in a first partition; and
rows with first-table-column values not in the qualifying set are placed in a second partition.

21. The computer program of claim 13, where the executable instructions that cause the computer to partition the second table into the two or more second-table partitions further cause the computer to:
create two or more work tables;
for each second-table row:
select a target work table based on the qualifying set and one or more second-table-row values; and
place the second-table row in the target work table.

22. The computer program of claim 21, where the executable instructions that cause the computer to select a target work table further cause the computer to:
   determine whether one of the second-table-row values is in the qualifying set.

23. The computer program of claim 13, where the executable instructions that cause the computer to partition the second table into the two or more second-table partitions further cause the computer to:
   create a work table with a partitioned-primary index;
   define the partitioned-primary index based on the qualifying set; and
   populate the work table from the second table.

24. The computer program of claim 23, where the executable instructions that cause the computer to define the partitioned-primary index based on the qualifying set further cause the computer to:
   define the partitioned-primary index so that:
      rows with second-table-column values in the qualifying set are placed in a first partition; and
      rows with second-table-column values not in the qualifying set are placed in a second partition.

25. A database system including:
   a massively parallel processing system including:
   one or more nodes;
   a plurality of CPUs, each of the one or more nodes providing access to one or more CPUs;
   a plurality of data storage facilities each of the one or more CPUs providing access to one or more data storage facilities;
   a process for execution on the massively parallel processing system for performing a database query including a join on an equality condition between one or more columns in a first table and one or more columns in a second table, each of the first table and the second table including zero or more rows, the process including:
      defining two or more first-table partitions, where each row in the first table appears in exactly one first-table partition;
      defining two or more second-table partitions, each second-table partition corresponding to a first-table partition, and where each row in the second table appears in exactly one second-table partition;
      where defining the two or more first-table partitions and the two or more second-table partitions includes:
         acquiring first-table-demographic data for the one or more columns in the first table, the demographic data including zero or more first-table-column values;
         acquiring second-table-demographic data for the one or more columns in the second table, the demographic data including zero or more second-table-column values;
         creating a qualifying set by joining the first table demographic data and the second table demographic data on the equality condition;
         partitioning the first table into the two or more first-table partitions, using the qualifying set; and
         partitioning the second table into the two or more second-table partitions, using the qualifying set; and
      for one or more corresponding first-table partitions and second-table partitions:
         performing the join on the first-table partition and the second-table partition;
         storing the result; and
         merging the results.

26. The database system of claim 25, where the demographic data includes one or more value count indexes.

27. The database system of claim 25, where the demographic data includes one or more compressed value lists.

28. The database system of claim 25, where the demographic data includes one or more column statistics.

29. The database system of claim 25, where partitioning the first table into the two or more first-table partitions includes:
   creating two or more work tables;
   for each first-table row:
      selecting a target work table based on the qualifying set and one or more first-table-row values; and
      placing the first-table row in the target work table.

30. The database system of claim 29, where selecting a target work table includes:
   determining whether one of the first-table-row values is in the qualifying set.

31. The database system of claim 25, where partitioning the first table into the two or more first-table partitions includes:
   creating a work table with a partitioned-primary index;
   defining the partitioned-primary index based on the qualifying set; and
   populating the work table from the first table.

32. The database system of claim 25, where defining the partitioned-primary index based on the qualifying set includes:
   defining the partitioned-primary index so that:
      rows with first-table-column values in the qualifying set are placed in a first partition; and
      rows with first-table-column values not in the qualifying set are placed in a second partition.

33. The database system of claim 25, where partitioning the second table into the two or more second-table partitions includes:
   creating two or more work tables;
   for each second-table row:
      selecting a target work table based on the qualifying set and one or more second-table-row values; and
      placing the second-table row in the target work table.

34. The database system of claim 33, where selecting a target work table includes:
   determining whether one of the second-table-row values is in the qualifying set.

35. The database system of claim 25, where partitioning the second table into the two or more second-table partitions includes:
   creating a work table with a partitioned-primary index;
   defining the partitioned-primary index based on the qualifying set; and
   populating the work table from the second table.

36. The database system of claim 35, where defining the partitioned-primary index based on the qualifying set includes:
   defining the partitioned-primary index so that:
      rows with second-table-column values in the qualifying set are placed in a first partition; and
      rows with second-table-column values not in the qualifying set are placed in a second partition.

\* \* \* \* \*